(12) United States Patent
Koike (10) Patent No.: US 8,008,828 B2
(45) Date of Patent: Aug. 30, 2011

(54) ELECTRIC ROTATING MACHINE

(75) Inventor: Akihito Koike, Kariya (JP)

(73) Assignee: Denso Corporation, Kariya (JP)

( * ) Notice: Subject to any disclaimer, the term of this patent is extended or adjusted under 35 U.S.C. 154(b) by 246 days.

(21) Appl. No.: 12/232,300

(22) Filed: Sep. 15, 2008

(65) Prior Publication Data

US 2009/0072652 A1  Mar. 19, 2009

(30) Foreign Application Priority Data

Sep. 14, 2007  (JP) .................................. 2007-238944

(51) Int. Cl.
*H02K 1/00* (2006.01)
*H02K 3/00* (2006.01)

(52) U.S. Cl. ........ 310/198; 310/179; 310/195; 310/180; 310/184

(58) Field of Classification Search .................. 310/198, 310/179, 195, 180, 184
See application file for complete search history.

(56) References Cited

U.S. PATENT DOCUMENTS

| | | | | |
|---|---|---|---|---|
| 3,746,964 | A * | 7/1973 | Guyton | 363/54 |
| 4,097,754 | A * | 6/1978 | Farr | 310/67 R |
| 4,134,055 | A * | 1/1979 | Akamatsu | 318/696 |
| 4,144,470 | A * | 3/1979 | Auinger | 310/198 |
| 4,710,661 | A * | 12/1987 | Gjota | 310/198 |
| 5,122,705 | A | 6/1992 | Kusase et al. | |
| 5,274,322 | A * | 12/1993 | Hayashi et al. | 322/90 |
| 5,449,962 | A * | 9/1995 | Shichijyo et al. | 310/184 |
| 5,559,385 | A * | 9/1996 | Yalovega et al. | 310/198 |
| 5,998,903 | A | 12/1999 | Umeda et al. | |
| 6,570,289 | B1 * | 5/2003 | Liang et al. | 310/179 |
| RE38,464 | E * | 3/2004 | Kusase et al. | 310/68 D |
| 6,784,583 | B2 | 8/2004 | Umeda | |
| 7,030,533 | B2 | 4/2006 | Umeda | |
| 2002/0093266 | A1 * | 7/2002 | Buening et al. | 310/198 |
| 2002/0113515 | A1 * | 8/2002 | Umeda | 310/184 |
| 2004/0150284 | A1 * | 8/2004 | Umeda | 310/179 |
| 2006/0006757 | A1 * | 1/2006 | Seguchi | 310/184 |
| 2006/0208594 | A1 | 9/2006 | Kashihara et al. | |
| 2006/0220488 | A1 * | 10/2006 | Koike et al. | 310/179 |
| 2006/0284510 | A1 * | 12/2006 | Tauvron et al. | 310/180 |

FOREIGN PATENT DOCUMENTS

| | | |
|---|---|---|
| JP | A-04-008140 | 1/1992 |
| JP | A-9-117085 | 5/1997 |
| JP | A-11-155270 | 6/1999 |
| JP | A-2002-247787 | 8/2002 |
| JP | A-2005-45987 | 2/2005 |
| WO | WO 2005/107040 A1 | 11/2005 |

* cited by examiner

*Primary Examiner* — Quyen Leung
*Assistant Examiner* — Alex W Mok
(74) *Attorney, Agent, or Firm* — Oliff & Berridge, PLC (57) ABSTRACT

The electric rotating machine includes a rotor around which a field coil is wound, and a stator including a stator core around which an armature winding is wound. The armature winding includes a first three-phase winding whose phase coils are delta-connected to form a delta winding, and a second three-phase winding whose phase coils are connected to corresponding nodes of the delta winding to form a star winding. The delta winding and the star winding are wound around the stator core such that the phase coils of the delta winding and the phase coils of the star winding share the same slots of the stator core.

5 Claims, 6 Drawing Sheets

ELECTRIC ROTATING MACHINE

CROSS-REFERENCE TO RELATED APPLICATION

This application is related to Japanese Patent Application No. 2007-238944 filed on Sep. 14, 2007, the contents of which are hereby incorporated by reference.

BACKGROUND OF THE INVENTION

1. Field of the Invention

The present invention relates to an electric rotating machine such as an alternator (generator) mounted on a passenger car or a truck.

2. Description of Related Art

In recent years, there has been an increasing demand for a vehicle alternators driven by an engine mounted on a vehicle, which generate less magnetic noise at the time of power generation, in order to contribute to upgrading the vehicle. However, on the other hand there has been an increasing demand for vehicle alternators having high power generation capacity because of an increase of electrical load due to an increased number of safety control devices and the like mounted on the vehicle. Accordingly, it has been required to provide small-sized, low-noise, and high-output vehicle alternators at a lower cost.

Figure 9:
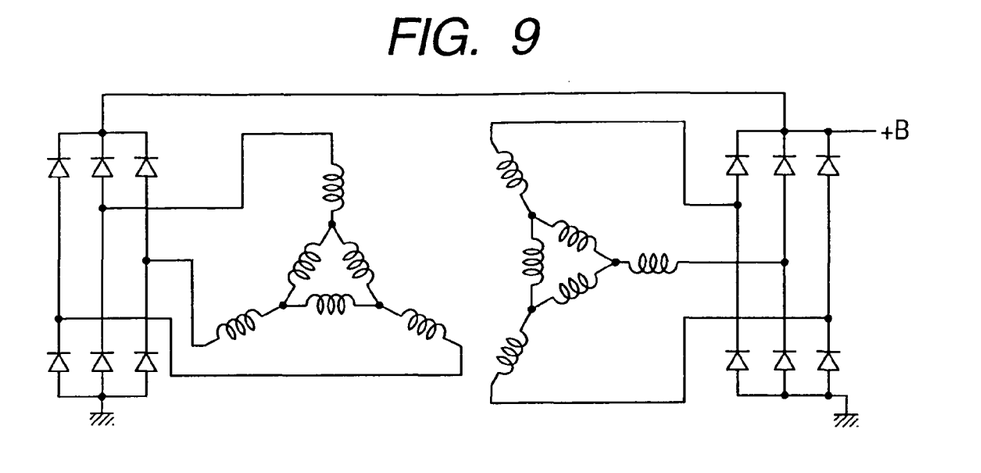
FIG. 9 is a wiring diagram of an armature winding of a conventional vehicle-mounted alternator.

To address such requirements, various methods for reducing magnetic noise of a vehicle alternator have been proposed. For example, Japanese Patent Application Laid-open No. 2002-247787 discloses an electric rotating machine with a stator including a stator core and an armature winding wound around the stator core. This electric rotating machine has a structure in which the armature winding includes two sets of three-phase windings each of which is delta-connected (Δ-connected), and each output terminal of one of the three-phase windings is series-connected to a corresponding phase coil of the other of the three-phase windings. According to this structure in which the delta-connected three-phase winding (may be referred to as delta winding hereinafter) is series-connected with the phase coils of the star-connected (Y-connected) three-phase winding (may be referred to as star winding hereinafter), it is possible to prevent a circulation current from flowing even when the generation voltages of theses three-phase windings are different from each other. This makes it possible to implement a small-sized and highly efficient alternator because there is no output loss due to circulation current. This patent document further discloses an electric rotating machine having a structure as shown in FIG. 9, in which two sets of armature windings are arranged so as to form an electrical angle of π/6 therebetween, each of the two armature windings being constituted by a delta winding and a star winding.

Figure 10:
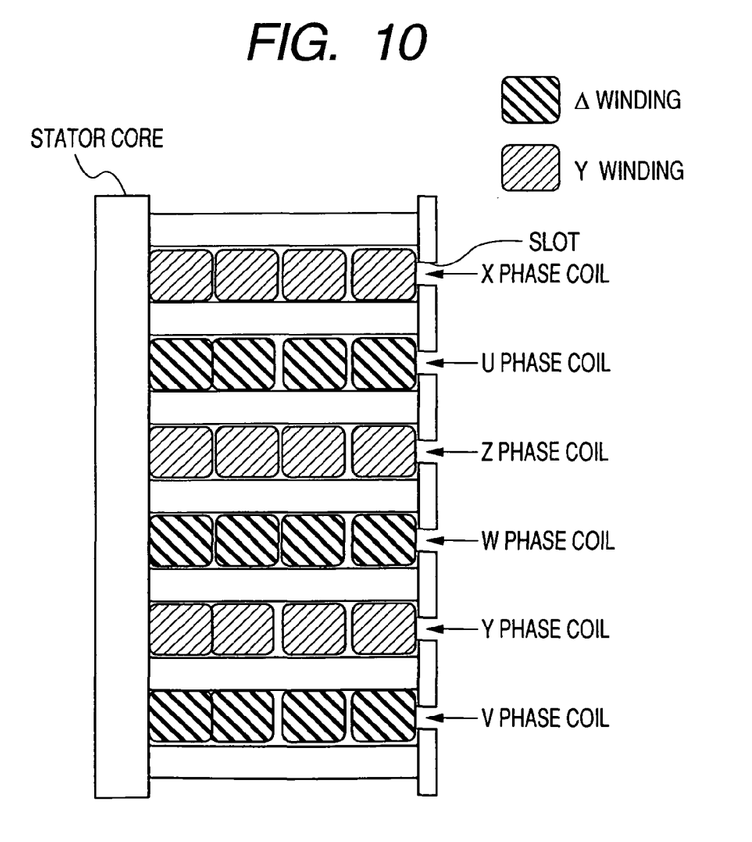
FIG. 10 is a diagram showing an arrangement of coils of a delta winding and a star winding in a stator core of the conventional alternator.

According to this structure in which the two three-phase windings are wound around a stator core with a phase difference of π/6 in electrical angle therebetween, the high frequency components of the reactive magnetomotive forces by the two three-phase windings, which are the main cause of magnetic noise, cancel out each other to thereby reduce the magnetic noise. However, since this structure needs two sets of rectifier devices for converting an AC current induced in the stator into a DC current, the manufacturing cost thereof is high. In addition, as shown in FIG. 10, in this structure, since the delta winding and star windings are located in different slots, the effect of reduction of magnetic noise is lowered due to magnetic force imbalance.

SUMMARY OF THE INVENTION

The present invention provides an electric rotating machine comprising:

a rotor around which a field coil is wound; and a stator including a stator core around which an armature winding is wound;

wherein the armature winding includes a first three-phase winding whose phase coils are delta-connected to form a delta winding, and a second three-phase winding whose phase coils are connected to corresponding nodes of the delta winding to form a star winding, the delta winding and the star winding being wound around the stator core such that the phase coils of the delta winding and the phase coils of the star winding share the same slots of the stator core.

The present invention also provides an electric rotating machine comprising:

a rotor around which a field coil is wound; and a stator including a stator core having an annular shape around which an armature winding is wound;

wherein the armature winding includes a first three-phase winding whose phase coils are delta-connected to form a delta winding, and a second three-phase winding whose phase coils are connected to corresponding nodes of the delta winding so as to form a star winding, the delta winding and the star winding being wound around the stator core such that the phase coils of the delta winding and the phase coils of the star winding being arranged in a row in a radial direction of the stator core in each slot of the stator core so that the phase coils of the delta winding and the star winding are located in concentric circles around an axial center of the stator core, in each of the concentric circles, an equal number of the phase coils of the delta winding and the phase coils of the star winding being located alternately in a circumferential direction of the stator core at a predetermined pitch.

According to the present invention, it is possible to provide an electric rotating machine whose magnetic noise is significantly lowered at low cost.

Other advantages and features of the invention will become apparent from the following description including the drawings and claims.

PREFERRED EMBODIMENTS OF THE INVENTION

Figure 1:
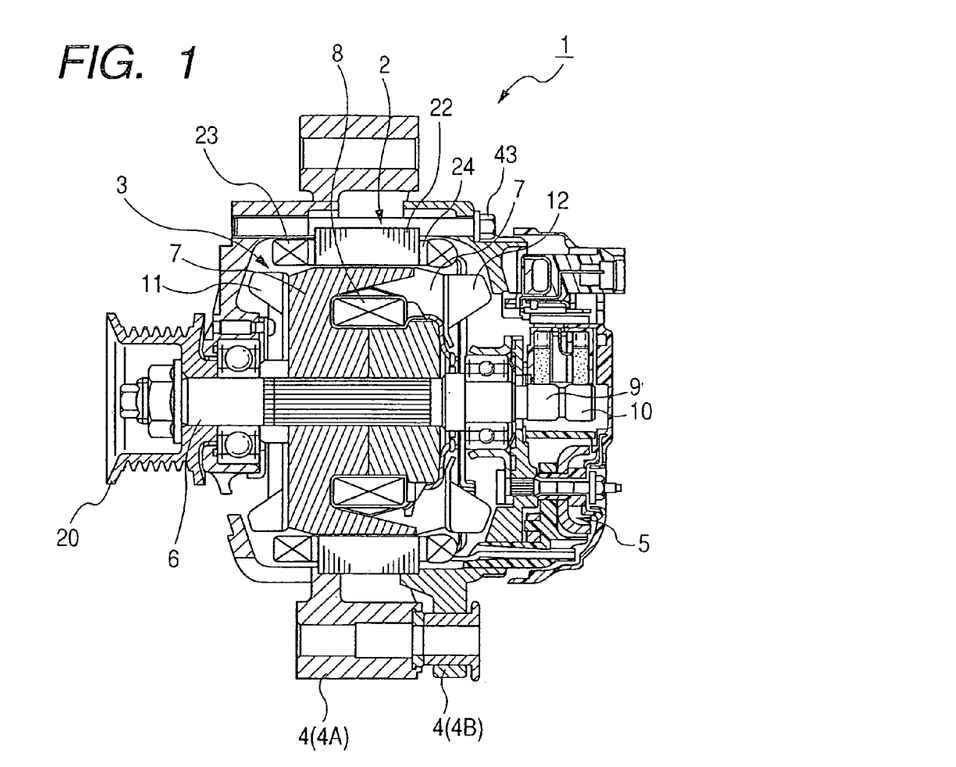
FIG. 1 is a diagram showing an overall structure of a vehicle-mounted alternator according to an embodiment of the invention.

FIG. 1 is a diagram showing an overall structure of a vehicle-mounted alternator 1 according to an embodiment of the invention. The alternator 1 includes a stator 2, a rotor 3, a frame 4, a rectifier device 5, etc.

The stator 2 includes a stator core 22, an armature winding 23 wound around the stator core 22, and an insulator 24 for providing insulation between the stator core 22 and the armature winding 23. The stator core 22, which is made by laminating thin steel sheets, is formed with a plurality of slots (72 slots, in this embodiment) at its inner peripheral surface. The armature winding 23 is constituted by two sets of three-phase windings 23A and 23B located in the 72 slots formed in the stator core 22. The armature winding 23 is explained in more detail later.

The rotor 3, which rotates together with a shaft 6, includes Lundell-type pole cores 7, a field coil 8, sliprings 9 and 10, a diagonal fan 11, and a centrifugal fan 12. The shaft 6 is coupled to a pulley 20, and driven to rotate by a vehicle engine (not shown). In this embodiment, the number of the rotor poles is twelve, and six slots of the stator core 22 correspond to one magnetic pole pitch.

The frame 4 houses the stator 2 and the rotor 3. The rotor 3 is supported so as to be rotatable around the shaft 6. The stator 2 is fixedly located at the circumference of the pole cores 7 of the rotor 3 with a certain gap therebetween. The frame 4 is constituted by a front frame 4A and a rear frame 4B bolted to each other by a plurality of bolts 43 so as to support the stator 2, etc. The rectifier 5, which is connected with lead wires leading from the armature winding 23, three-phase full-wave rectifies a three-phase AC voltage outputted from the armature winding 23 to convert it into a DC voltage.

The rotor 3 of the alternator 1 rotates in a predetermined direction when torque is transmitted from the engine to the pulley 20 through a belt or the like. In this state, when an excitation voltage is applied to the field coil 8 of the rotor 3 from the outside, the claw-shaped pole portion of each pole core 7 is excited, and a three-phase AC voltage is induced in the armature winding 23, as a result of which the rectifier device 5 outputs a DC voltage from the output terminal thereof.

Figure 2:
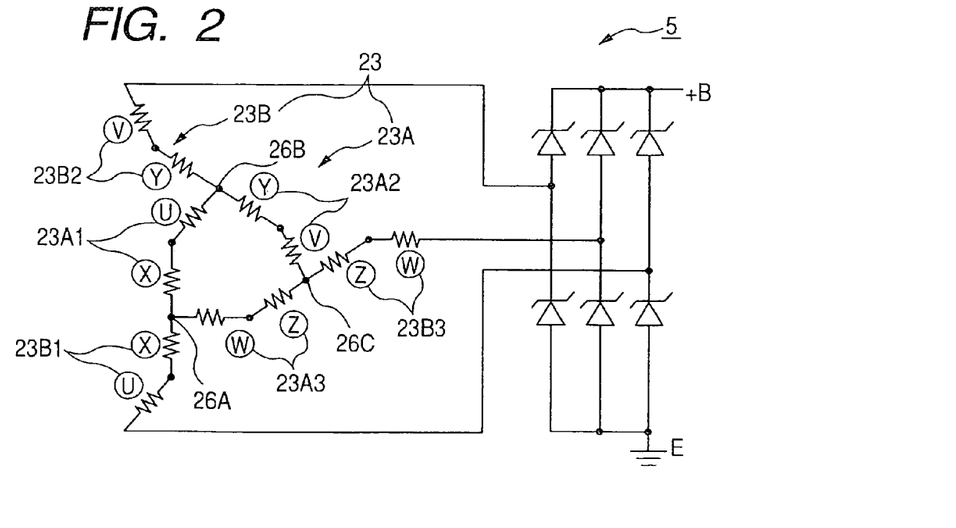
FIG. 2 is a wiring diagram of an armature winding of the alternator according to the embodiment of the invention.

Next, the details of the stator 2 are explained. FIG. 2 is a wiring diagram of the armature winding 23. As described above, the armature winding 23 is constituted by two sets of the three-phase windings 23A and 23B. The three-phase winding 23A is formed by delta-connecting an X-U phase wiring 23A1, a Y-V phase wiring 23A2 and a Z-W phase wiring 23A3 which are spaced every four slots ($2\pi/3$ in electrical angle). The X-U phase wiring 23A1 is constituted by a series connection of an X phase coil and a U phase coil which are spaced by one slot ($\pi/6$ in electrical angle). The Y-V phase winding 23A2 is constituted by a series connection of a Y phase coil and a V phase coil which are spaced by one slot ($\pi/6$ in electrical angle). The Z-W phase winding 23A3 is constituted by a series connection of a Z phase coil and a W phase coil which are spaced by one slot ($\pi/6$ in electrical angle).

The other three-phase winding 23B is formed by an X-U phase wiring 23B1, a Y-V phase wiring 23B2 and a Z-W phase wiring 23B3 which are spaced by four slots ($2\pi/3$ in electrical angle). The X-U phase winding 23B1 is constituted by a series connection of an X phase coil and a U phase coil which are spaced by one slot ($\pi/6$ in electrical angle). The Y-V phase winding 23B2 is constituted by a series connection of a Y phase coil and a V phase coil which are spaced by one slot ($\pi/6$ in electrical angle). The Z-W phase winding 23B3 is constituted by a series connection of a Z phase coil and a W phase coil which are spaced by one slot ($\pi/6$ in electrical angle).

The X phase coil, Y phase coil and Z phase coil of the three-phase winding 23B are connected respectively to three nodes 26A, 26B and 26C as three output terminals of the three-phase winding 23A. On the other hand, the U phase coil, V phase coil and W phase coil of the three-phase winding 23B are connected to the rectifier device 5. By such a connection, the structure in which the delta-connected three-phase winding 23A is series-connected to the star-connected three-phase winding 23B is implemented.

In this embodiment having such a winding structure, unlike conventional alternators, there is no circulation current flowing from a high-voltage side three-phase winding to a low-voltage side three-phase winding. Accordingly, according to this embodiment, since the reduction of a power generation current, and increase of heat generation due to the circulation current can be suppressed, it is possible to provide a small-sized and highly efficient alternator for use in vehicles.

In addition, unlike conventional alternators, it is not necessary to determine the number of winding turns of each of the two sets of three-phase windings in order to ensure equal power generation voltages between the two sets of three-phase windings. This makes it possible to individually set the numbers of winding turns of the two sets of the three-phase windings, which increases design freedom.

In addition, since the three-phase windings 23A and 23B are located so as to have a phase difference of $\pi/6$ in electrical angle therebetween, their reactive magnetomotive forces cancel out each other, to thereby reduce the magnetic noise. Furthermore, since the three-phase windings 23A and 23B are connected in series, by connecting only one of the two sets of the three-phase windings to the rectifier device, the generation power can be taken out from the alternator 1. Accordingly, in this embodiment, the single rectifier device 5 suffices for the two sets of the three-phase windings 23A and 23B. Compared to conventional alternators in which two rectifier devices are provided for two sets of three-phase windings, the number of rectifying elements can be reduced by half, to thereby reduce parts cost and assembling costs.

Figure 3:
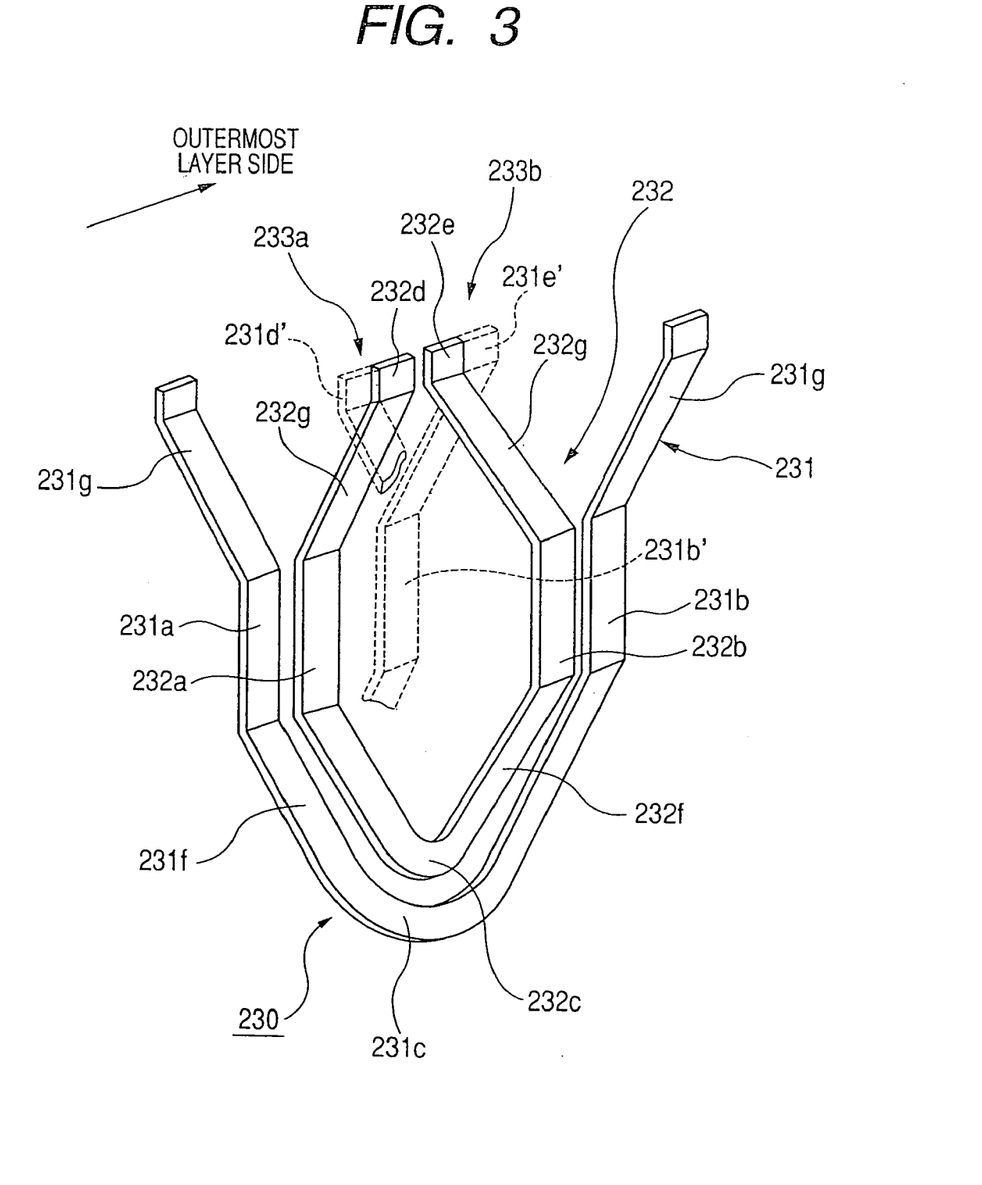
FIG. 3 is a perspective view of a conductor segment constituting the armature winding of the alternator according to the embodiment of the invention.
Figure 4:
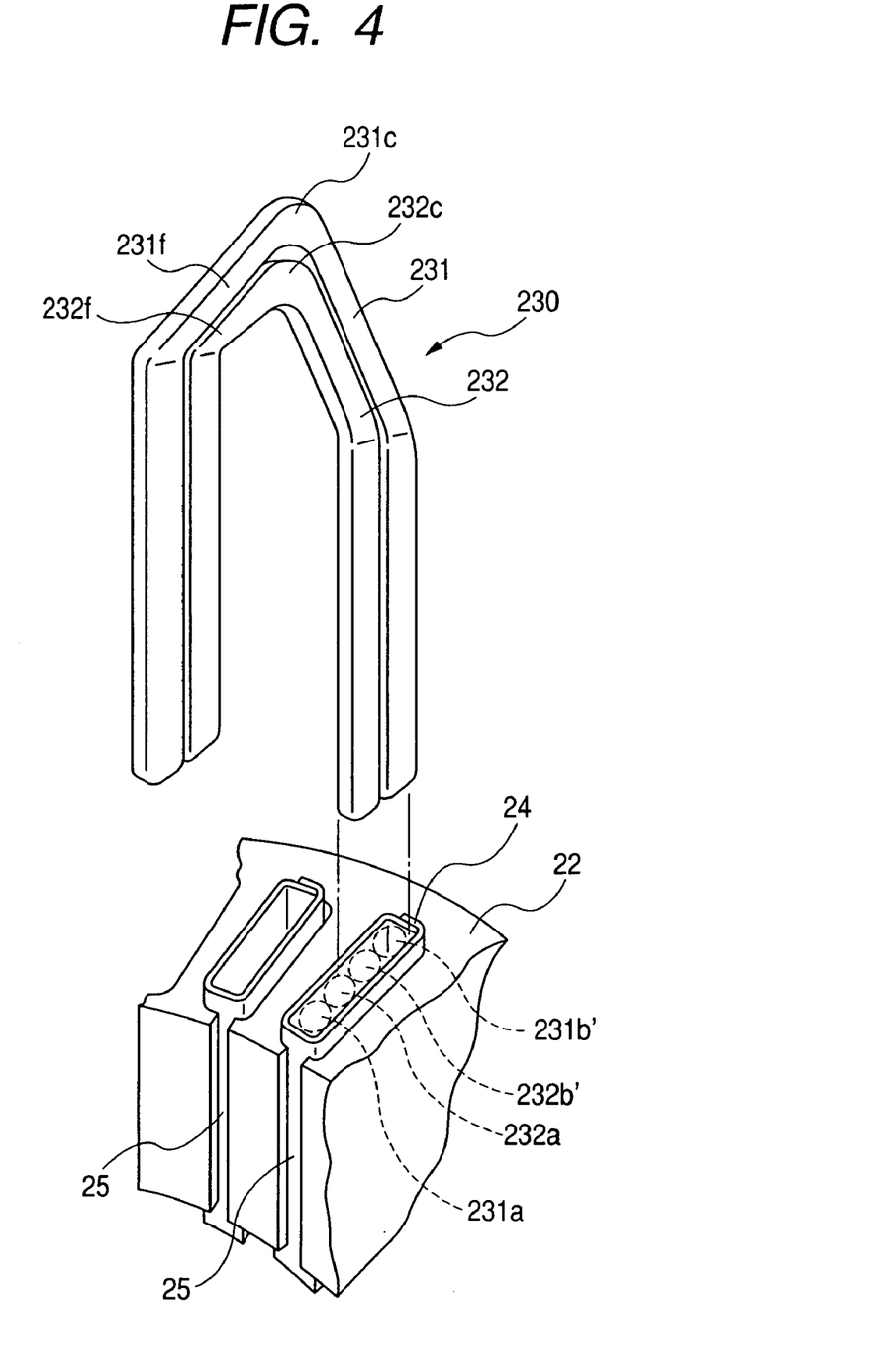
FIG. 4 is a diagram explaining how the conductor segment is assembled in a stator of the alternator according to the embodiment of the invention.
Figure 5:
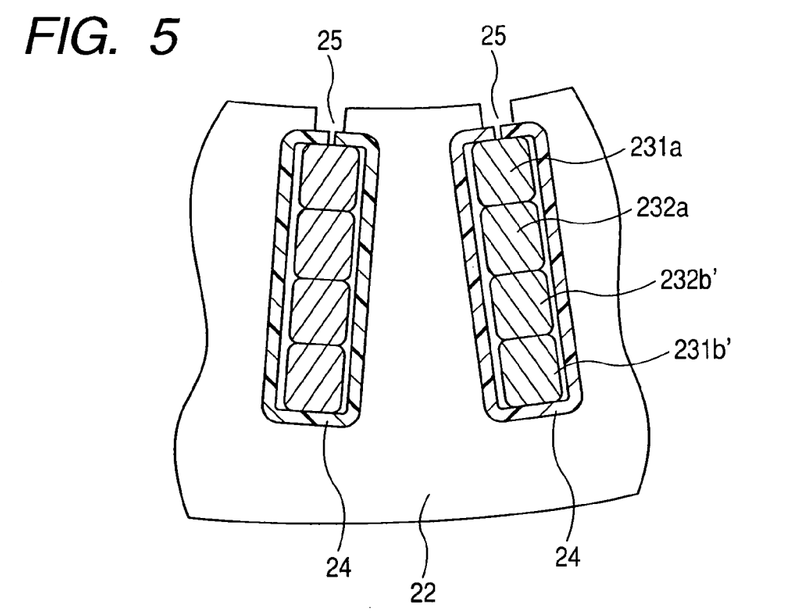
FIG. 5 is a partial cross-sectional view of the stator of the alternator according to the embodiment of the invention.
Figure 6:
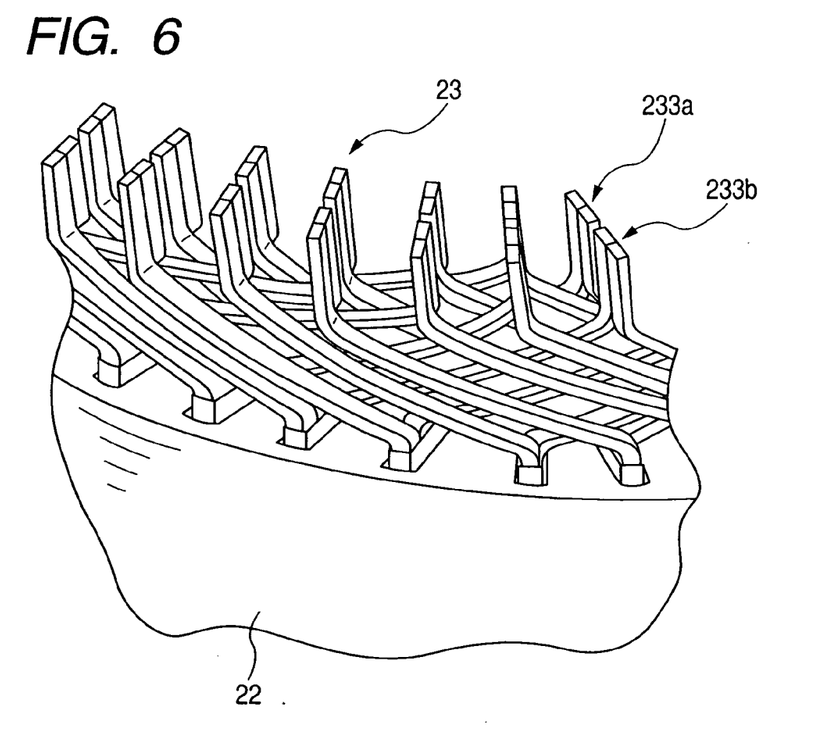
FIG. 6 is a partial perspective view of the stator of the alternator according to the embodiment of the invention.
Figure 7:
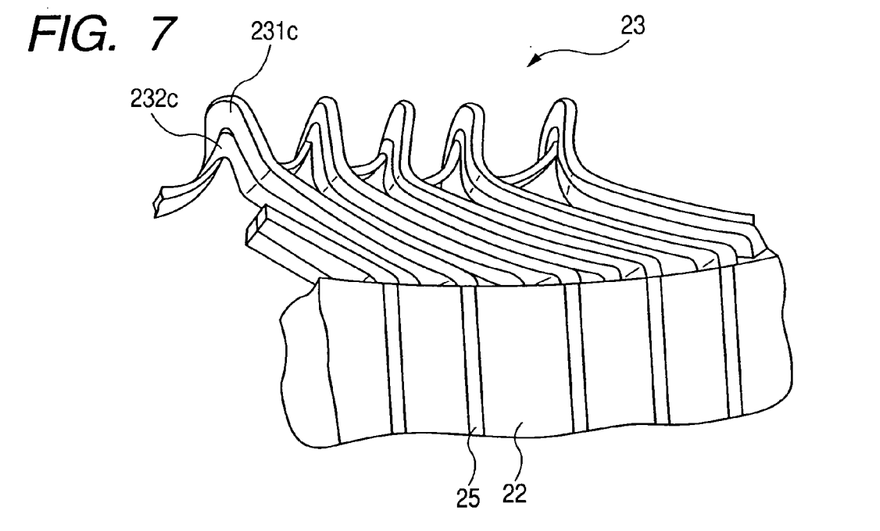
FIG. 7 is a partial perspective view of the stator of the alternator according to the embodiment of the invention.

Next, the structure of conductor segments constituting the armature winding 23, and the arrangement of them in the slots 25 of the stator core 22 are explained. FIG. 3 is a perspective view of one of the conductor segments constituting the armature winding 23. FIG. 4 is a diagram explaining how the conductor segment is assembled in the slot. FIG. 5 is a partial cross-sectional view of the stator 2. FIGS. 6 and 7 are a partial perspective view of the stator 2.

In this embodiment, the armature winding 23 is formed by joining a plurality of the conductor segments having a U-like shape and a rectangular cross-section. Accordingly, as shown in FIG. 3, the armature winding is constituted by a plurality of electrical conductors, and each slot 25 contains an even number of electrical conductors (4 electric conductors in this embodiment). As shown in FIGS. 4 and 5, in this embodiment, the four electrical conductors contained in each slot 25 are arranged in a row as an electrical conductor 231a at an innermost layer, an electrical conductor 232a at an inner middle layer, and electrical conductor 232b' at an outer middle layer, and an electrical conductor 231b' at an outermost layer from inside to outside of the slot 25 in the radial direction of the stator core 22.

The electrical conductor 231a at the innermost layer of one slot 25 and the electrical conductor 231b at the outer most layer of another slot 25 spaced from this one slot 25 by one magnetic pole pitch (6 slots) in the clockwise direction of the stator core 22 are paired with each other. Likewise, the electrical conductor 232a at the inner middle layer of one slot 25 and the electrical conductor 232b at the outer middle layer of another slot 25 spaced from this one slot 25 by one magnetic pole pitch in the clockwise direction of the stator core 22 are paired with each other. Each of these paired electrical conductors are connected through a turn portion 231c or 232c at a side of one end surface in the axial direction of the stator core 22 by using a continuing line.

Accordingly, as shown in FIG. 7, at the one end surface of the stator core 22, the continuing line which connects the electrical conductor 232b at the outer middle layer and the electrical conductor 232a at the inner middle layer through the turn portion 232c is surrounded by the continuing line which connects the electrical conductor 231b at the outermost layer and the electrical conductor 231a at the innermost layer through the turn portion 231c. Hence, at the one end surface of the stator core 22, the turn portion 232c as a connecting portion of the paired electrical conductors is surrounded by the turn portion 231c as a connection portion of another paired electrical conductors contained in the same slot 25. By connecting the electrical conductor 232b at the outer middle layer and the electrical conductor 232a at the inner middle layer, a middle-layer coil end is formed. By connecting the electrical conductor 231b at the outermost layer and the electrical conductor 231a at the innermost layer, an end-layer coil end is formed.

On the other hand, the electrical conductor 232a at the inner middle layer of the one slot 25 and the electrical conductor 231a' at the inner most layer of another slot 25 spaced from this one slot 25 by one magnetic pole pitch in the clockwise direction of the stator core 22 are also paired with each other.

Likewise, the electrical conductor 231b' at the outermost layer of the one slot 25 and the electrical conductor 232b' at the outer middle layer of another slot 25 spaced from this one slot 25 by one magnetic pole pitch in the clockwise direction of the stator core 22 are also paired with each other. Each of these paired electrical conductors is connected at the other end surface of the stator core 22.

Accordingly, as shown in FIG. 6, at the side of the other end surface of the stator core 22, an outer joint portion 233b connecting the electrical conductor 231b' at the outermost layer and the electrical conductor 232b at the outer middle layer, and an inner joint portion 233a connecting the electrical conductor 231a' at the innermost layer and the electrical conductor 232a at the inner middle layer are disposed spaced from each other in the radial direction and in the circumferential direction. By connecting the electrical conductor 231b' at the outermost layer and the electrical conductor 232b at the outer middle layer, and connecting the electrical conductor 231a' at the innermost layer and the electrical conductor 232a at the inner middle layer, two adjacent-layer coil ends are formed in concentric circles around an axial center of the stator core 22.

As shown in FIG. 3, the electrical conductor 231a at the innermost layer and the electrical conductor 231b at the outermost layer are provided as a large segment 231 formed by shaping the electrical conductors into a U-shape. The electrical conductor 232a at the inner middle layer and the electrical conductor 232b at the outer middle layer are provided as a small segment 232 formed by shaping the electrical conductors into U-shape. The large segment 231 and the small segment 232 constitute an elementary conductive segment 230. The large segment 231 includes a portion located inside the slot 25 and extending in the axial direction, and skew portions 231f, 231g extending at a slant by a predetermined angle with respect to the axial direction. Likewise, the small segment 232 includes a portion located inside the slot 25 and extending in the axial direction, and skew portions 232f, 232g extending at a slant by the predetermined angle with respect to the axial direction. These skew portions form coil-end groups projecting in the axial direction from each of the both end surfaces of the stator core 22. The air passage of cooling air generated by the diagonal fan 11 and centrifugal fan 12 mounted on both end surfaces of the rotor 3 mainly runs through the skew portions. Lead wires 27 of the armature winding 23 are also located in this air passage.

In the coil-end group at the opposite side of the turn portions, a joint between an end portion 231e' of the outermost layer and an end portion 232e of the outer middle layer, and a joint between an end portion 232d of the inner middle layer and an end portion 231d' of the innermost layer are made by electric welding, ultrasonic welding, or arc welding. By these joints, the outer joint portion 233b and the inner joint portion 233a are formed.

The armature winding 23 constituted by the conductor segments 230 having the above described structure has the wiring configuration shown in FIG. 2. In the following, the arrangement of phase coils of each winding in 6 slots (#1 to #6 slots) corresponding to one magnetic pole pitch is explained. Each successive six of #7 to #72 slots have the same arrangement as that of #1 to #6 slots.

Figure 8:
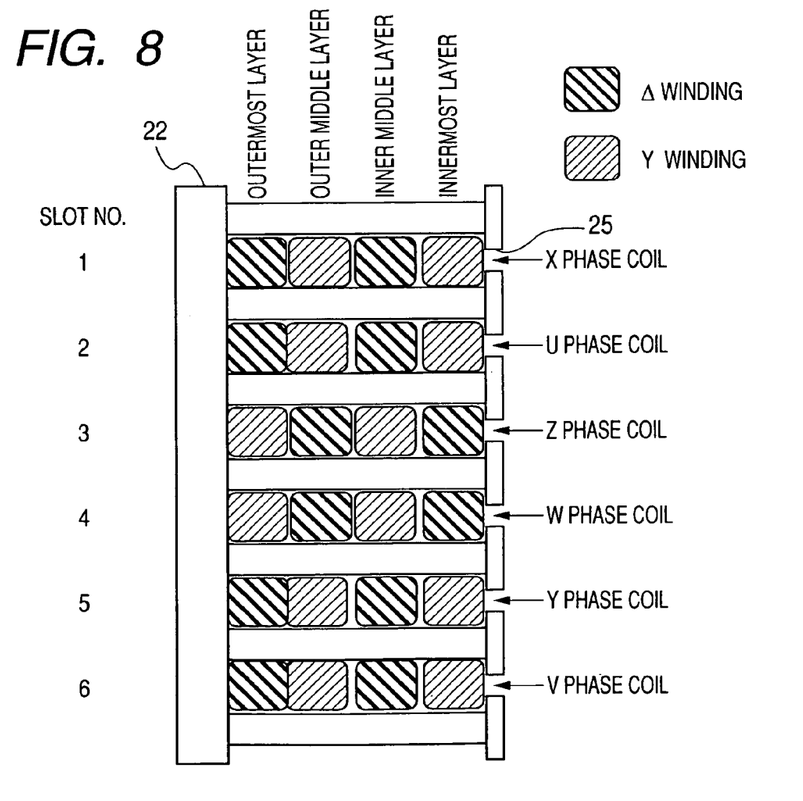
FIG. 8 is a diagram showing an arrangement of coils of a delta winding and a star winding in a stator core of the alternator according to the embodiment of the invention.

As shown in FIG. 8, in the #1 slot 25, the X phase coil of the delta-connected three-phase winding 23A (X-U phase winding 23A1) is located at the outermost layer and the inner middle layer, and the X phase coil of the Y-connected three-phase winding 23B (X-U phase winding 23B1) is located at the outer middle layer and the innermost layer, so that the X phase coil of the delta winding and the X phase coil of the star winding are located at the adjacent-but-one layers in the same slot.

In the #2 slot 25, the U phase coil of the delta-connected three-phase winding 23A (X-U phase winding 23A1) is located at the outermost layer and the inner middle layer, and the U phase coil of the Y-connected three-phase winding 23B (X-U phase winding 23B1) is located at the outer middle layer and the innermost layer, so that the U phase coil of the delta winding and the U phase coil of the star winding are located at the adjacent-but-one layers in the same slot.

In the #3 slot 25, the Z phase coil of the delta-connected three-phase winding 23A (Z-W phase winding 23A3) is located at the outer middle layer and the innermost layer, and the Z phase coil of the Y-connected three-phase winding 23B (Z-W phase winding 23B3) is located at the outermost layer and the inner middle layer, so that the Z phase coil of the delta winding and the Z phase coil of the star winding are located at the adjacent-but-one layers in the same slot.

In the #4 slot 25, the W phase coil of the delta-connected three-phase winding 23A (Z-W phase winding 23A3) is located at the outer middle layer and the innermost layer, and the W phase coil of the Y-connected three-phase winding 23B (Z-W phase winding 23B3) is located at the outermost layer and the inner middle layer, so that the W phase coil of the delta winding and the W phase coil of the star winding are located at the adjacent-but-one layers in the same slot.

In the #5 slot 25, the Y phase coil of the delta-connected three-phase winding 23A (Y-V phase winding 23A2) is located at the outermost layer and the inner middle layer, and the Y phase coil of the Y-connected three-phase winding 23B (Y-V winding 23B2) is located at the outer middle layer and the innermost layer, so that the Y phase coil of the delta winding and the Y phase coil of the star winding are located at the adjacent-but-one layers in the same slot.

In the #6 slot 25, the V phase coil of the delta-connected three-phase winding 23A (Y-V phase winding 23A2) is located at the outermost layer and the inner middle layer, and the V phase coil of the Y-connected three-phase winding 23B (Y-V, winding 23B2) is located at the outer middle layer and the innermost layer, so that the V phase coil of the delta winding and the V phase coil of the star winding are located at the adjacent-but-one layers in the same slot.

By series-connecting the X phase coil located at the outermost and inner middle layers with the U phase coil located at the outermost and inner middle layers of two adjacent slots 25, series-connecting the Y phase coil located at the outermost and inner middle layers with the V phase coil located at the outermost and inner middle layers of two adjacent slots 25, and series-connecting the Z phase coil located at the outer middle and innermost layers with the W phase coil located at the outer middle and innermost layers of two adjacent slots 25, the X-U phase winding 23A1, Y-V phase winding 23A2, and Z-W phase winding 23A3 are formed. By delta-connecting these windings, the one three-phase winding 23A can be formed.

By series-connecting the X phase coil located at the outer middle and innermost layers with the U phase coil located at the outer middle and innermost layers of two adjacent slots 25, series-connecting the Y phase coil located at the outer middle and innermost layers with the V phase coil located at the outer middle and innermost layers of two adjacent slots 25, and series-connecting the Z phase coil located at the outermost and inner middle layers with the W phase coil located at the outermost and inner middle layers of two adjacent slots 25, the X-U phase winding 23B1, Y-V phase winding 23B2, and Z-W phase winding 23B3 are formed. By connecting these windings to the nodes 26A, 26B, and 26C of the three-phase winding 23A, respectively, the other three-phase winding 23B can be formed.

As has been clear from the above explanation, according to this embodiment, since the one three-phase winding 23A formed as the delta winding is connected with each phase coil of the other three-phase winding 23B formed as the star winding, it is possible to prevent a circulation current from flowing even when the generation voltages of theses three-phase windings are different from each other. Since the delta winding and the star winding are located in the stator core 22 in a state of sharing the same slots, magnetic noise due to magnetic force imbalance can be lowered. Furthermore, the conventional structure of the armature winding shown in FIG. 9 needs two sets of rectifier devices for converting an AC current induced in the stator into DC current, this embodiment only needs a single rectifier device. Accordingly, the manufacturing cost can be reduced.

In this embodiment, since each of the slots 25 houses the equal number of the coils of the delta winding and the coils of the star winding, the effect of reducing the magnetic noise due to magnetic force imbalance is increased.

Since the coils of the delta winding and the coils of the star winding are alternately disposed in the radial direction in each of the slots 25, the effect of reducing magnetic noise due to magnetic force imbalance is further increased.

Since each of the delta winding and the star winding has such a structure that the same wiring configuration is repeated every certain number of slots (two every two slots in this embodiment) in the circumferential direction of the stator core 22, the effect of reducing magnetic noise due to magnetic force imbalance is further increased.

The armature winding 23 is constituted by connecting a plurality of the electrical conductors in succession after they are assembled in the slots. Accordingly, the armature winding 23 can have a high rigidity, and magnetic noise can be further reduced. In addition, since bending work and joining work of the electrical conductors can be simplified, and accordingly manufacturing equipment can be simplified, the manufacturing cost can be significantly reduced.

The electrical conductors have a rectangular cross-section. This makes it possible to increase the space ratio of the electrical conductors in each slot of the stator core, and narrow the clearance between the stator and the windings, as a result of which vibration of the stator and the winding can be suppressed.

It is a matter of course that many modifications can be made to the above described embodiment.

For example, arrangement of the coils of the delta wiring and the star winding in each slot may be different from the one described in the above embodiments if delta winding and the star winding are located in the stator core 22 in a state of sharing the same slots.

The above explained preferred embodiments are exemplary of the invention of the present application which is described solely by the claims appended below. It should be understood that modifications of the preferred embodiments may be made as would occur to one of skill in the art.

What is claimed is:

1. An electric rotating machine comprising:
a rotor around which a field coil is wound; and
a stator including a stator core formed with slots around which an armature winding is wound, wherein:
said armature winding includes a first three-phase winding whose phase coils are delta-connected to form a delta winding, and a second three-phase winding whose phase coils are connected to corresponding nodes of said delta winding to form a star winding,
each of said phase coils of said first three-phase winding being constituted of a series connection of a first winding and a second winding, said first and second windings being wound around said stator core such that said first and second windings are displaced to each other with respect to said slots of said stator core,
each of said phase coils of said second three-phase winding being constituted of a series connection of a third winding and a fourth winding, said third and fourth windings being wound around said stator core such that said third and fourth windings are displaced to each other with respect to said slots of said stator core,
said delta winding and said star winding being wound around said stator core such that one of said first and second windings and one of said third and fourth windings share the same slots of said stator core, and the other of said first and second windings and the other of said third and fourth windings share the same slots of said stator core,
said delta winding and said star winding being connected to a common rectifier device,
each slot of said stator core houses an equal number of said phase coils of said delta winding and said phase coils of said star winding, and said phase coils of said delta winding and said phase coils of said star winding are alternately located in a radial direction of said stator core in each slot of said stator core.

2. The electric rotating machine according to claim 1, wherein said delta winding and said star winding have such a structure that the same wiring configuration is repeated every predetermined number of slots in a circumferential direction of the said stator core.

3. The electric rotating machine according to claim 2, wherein said predetermined number is two.

4. The electric rotating machine according to claim 1, wherein said armature winding is constituted by joining a plurality of electrical conductors in succession.

5. The electric rotating machine according to claim 4, wherein each of said electrical conductors has a rectangular cross-section.

* * * * *